United States Patent [19]
Ostberg

[11] 3,933,637
[45] Jan. 20, 1976

[54] FLUID HANDLING AND SEPARATING

[76] Inventor: Jan-Erik Ostberg, Torps Sateri, 640 33 Bettna, Sweden

[22] Filed: Nov. 14, 1974

[21] Appl. No.: 523,736

Related U.S. Application Data

[63] Continuation-in-part of Ser. No. 286,831, Sept. 6, 1972, abandoned.

[52] U.S. Cl. .......... 210/83; 75/24; 75/61; 210/84; 210/512; 233/1 R; 266/1 R; 266/37

[51] Int. Cl.$^2$... B01D 21/26; C21B 3/04; C21B 7/14

[58] Field of Search .......... 75/24, 46, 61; 210/77, 210/83, 84, 512, 513, 538; 233/1 R, 25, 26, 27, 28; 266/1 R, 37

[56] References Cited

UNITED STATES PATENTS

| | | | |
|---|---|---|---|
| 399,123 | 3/1889 | Adams et al. | 266/37 X |
| 3,756,806 | 9/1973 | Hathorn | 75/93 R |
| 3,867,132 | 2/1975 | Perry | 75/24 X |
| 3,897,336 | 7/1975 | Bydalek et al. | 210/416 R X |

FOREIGN PATENTS OR APPLICATIONS

| | | | |
|---|---|---|---|
| 344,817 | 4/1960 | Switzerland | 266/37 |
| 117,735 | 5/1958 | U.S.S.R. | 266/1 R |

*Primary Examiner*—Charles N. Hart
*Assistant Examiner*—Robert G. Mukai

[57] ABSTRACT

For separating slag from heavy metal melts, as iron, steel and copper, a pipe-like body is used into which the slag and metal are drawn and which is rotated about its axis to cause the molten metal to form a layer within the pipe-like body on the outside of a slag layer, the dividing surface between the slag and the metal having the shape of a part of a paraboloid of revolution. The arrangement is tilted at an angle, and at its upper end is provided with a wall over which the slag can escape while holding the molten metal. At its lower end it is provided with a trap arrangement which allows molten metal to flow back downwardly into the main body of melt while preventing the return of the slag.

The arrangement can also be used as a mixer.

6 Claims, 6 Drawing Figures

FLUID HANDLING AND SEPARATING

RELATED APPLICATIONS

This application is a continuation-in-part of application Ser. No. 286,831, filed Sept. 6, 1972, and now abandoned.

BACKGROUND OF THE INVENTION

1. Field of the Invention

The invention relates to an arrangement for transporting, for separating and for mixing metallurgical melts and slags.

2. The Prior Art

One example often arising in practice of fluids which are difficult to handle is the problem of separating slag from the surface of a metal melt. The usual procedures for this purpose consist in tipping a container in which the metal melt and slag are held, for example an oven, a pan or the like, to such a degree that the surface of the melt reaches an edge which serves as a dam against overflow. By means of this dam the metal melt is held back, whereas the slag can flow over an edge of the dam. Often additional methods are used, in which the filling of the container produces a flow in the direction of such edge. Also suction arrangements are known, which suck off the slag from the surface of the melt. Such arrangements are used when tipping of the container is impossible or accompanied with special difficulties or disadvantages.

These processes are difficult and expensive and time-consuming, especially if it is required that the slag be removed without residue, without also losing at the same time metal melt. But loss of metal melt is often unavoidable, because often metal melt is held in the slag, the melt because of the surface tension forming small balls.

Fluids of different density, especially metallurgical melts, must also often be treated in such a way that a pre-determined flow path is produced in the fluid. The purpose of such a flow can differ. The treatment can be to eliminate inhomogeneities of different kinds, to accelerate a reaction or to bring a melt layer to chemical equilibrium.

SUMMARY OF THE INVENTION

Through the invention an arrangement is provided which serves to separate slag from molten metal, without requiring that the fluid container in which they are held be tipped.

The arrangement according to the invention for the transport, separation or mixing of metallurgical melts and slag, is characterised by a pipe-like body with an outlet opening at the front, the inner diameter of which is smaller than the inner diameter of the interior space of the pipe-like body, an inlet opening and a trap, the inside diameter of which is smaller than the inside diameter of the outlet opening and around the circumference of which at least one passage to the outlet opening exists and an arrangement for rotatably mounting the pipe-like body for turning about a slanting axis and imparting rotation to it.

If the forward end of the pipe-like body is held in a fluid, for example at the surface of a metal melt covered with slag, and the pipe-like body is then rotated at a sufficient speed, the melt and the slag travel into the interior of the body. The specifically heavy metal melt is through centrifugal force accelerated outward and upward and lies on the inner wall of the pipe-like body. The specifically lighter slag forms an inner layer which through centrifugal force is also accelerated outward and upward. The dividing surface between the layers has the shape of a part of a paraboloid of revolution. The outflow of the slag towards the bottom is prevented through the trap, but not the outflow of an excess of the specifically heavier metal melt. This can travel back over the passage which is associated with the trap into the container. When the slag is to be drawn off, it moves to an opening at the upper end of the pipe-like body, the inner diameter of which is smaller than the inner diameter of the body. Thereby the movement of the metal melt at the upper end of the pipe-like body is held back, whereas the specifically lighter slag can escape through the upper opening. During the removal of slag (or another specifically lighter fluid), the pipe-like body is held at an angle in the fluid, with the forward end lying deeper than the rear end. The arrangement according to the invention can however also be used for example for mixing. In this case the rear end of the pipe-like body is closed.

DESCRIPTION OF THE PREFERRED EMBODIMENTS

Figure 1:
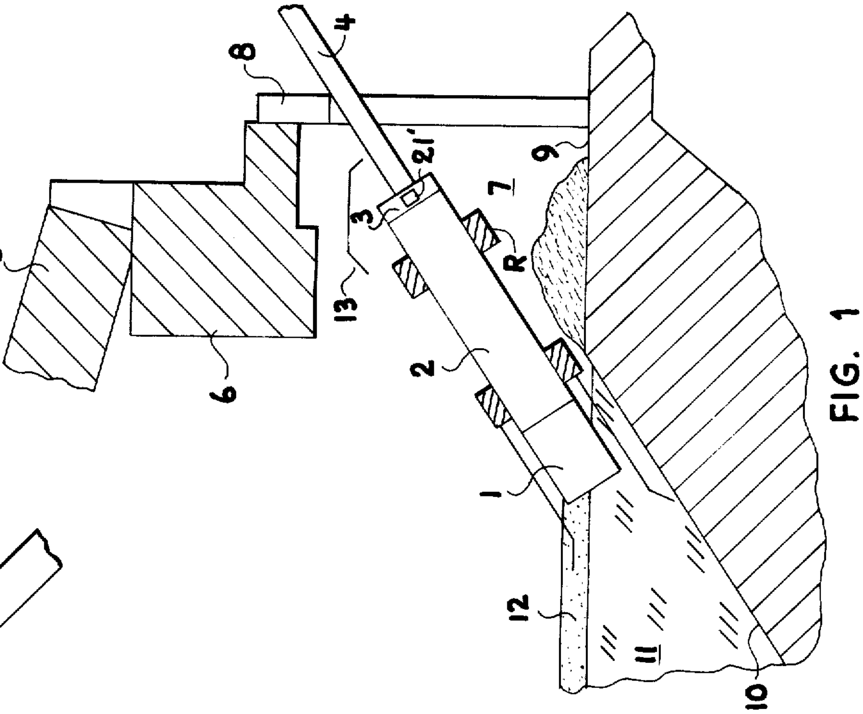
FIG. 1 is a vertical cross-section of an opening in a melt container, wherein through the opening an arrangement according to the invention is introduced.

In FIG. 1, a pipe-like body 1, 2, 3 is shown. This body extends through an opening of a metallurgical oven. In FIG. 1 the oven is provided with a cover 5, a wall 6, a working opening 7 and a cooling box 8. The working opening 7 is limited below by a surface 9. Only a part of the interior of the oven is shown, namely an inwardly and downwardly sloping hearth 10. In the oven is metal melt 11 on which an upper surface, a slag layer 12 floats. Above the pipe-like body 1, 2, 3 a shield 13 is arranged, which has the purpose of directing the slag which is expelled through the opening in the upper part of the pipe-like body downwardly, for example to a further transport arrangement not shown here.

Figure 2:
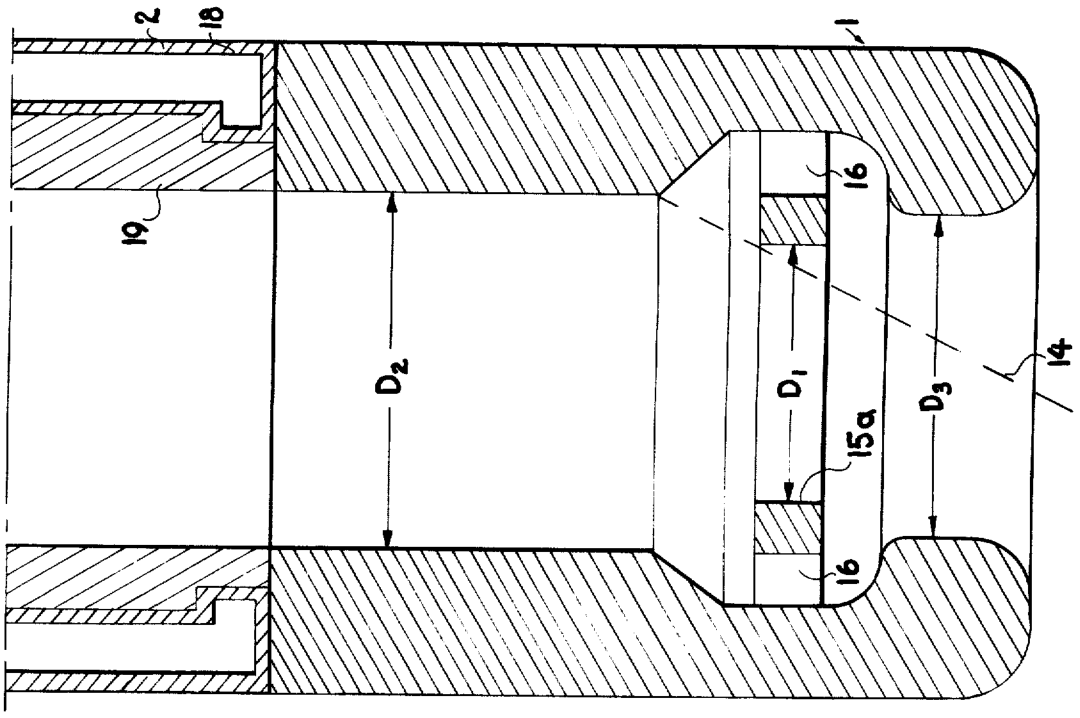
FIG. 2 shows the forward end of the arrangement according to the invention in cross-section in an enlarged view.

In FIG. 2, the forward part of the pipe-like body is shown, which during operation is inserted partly in the fluid, as shown in FIG. 1. The surface of the melt should be positioned at the dotted line 14. The slag layer is not shown in FIG. 2. The depth of penetration is so chosen that the forward end 1 of the pipe-like body is rotated in the boundary between the metal melt and the slag. The part 1 has a mouth 15*a*, behind which a trap is arranged. This trap consists of an inner ring, whose inner diameter $D_1$ is smaller than the inner diameter $D_2$ of the pipe-like body in general. At the circumference of the ring are one or more openings 16, which form passages, which connect the inside of the pipe-like body with the mouth opening 15*a*. The diameter $D_3$ of the mouth 15*a* is greater than the diameter $D_1$, but is smaller than the diameter $D_2$.

Through the arrangement of the trap ring an obstruction is formed which prevents the fluid from flowing out completely. The obstructive action requires the condition that the trap ring has a smaller inner diameter $D_1$ than the inner part of the pipe-like body. It is also important that the diameter $D_3$ of the mouth 15 is also somewhat smaller than the diameter $D_2$. There are thus two obstacles provided, one of which provides the control of the outflow of the heavy metal melt whereas the construction of the other is such that the backflow of the specifically lighter fluid (in the foregoing example, slag) is blocked. The slag escapes over the edge 20 because of which the thickness of the slag layer does not become sufficiently great so that its inner diameter is less than $D_1$, which is smaller than $D_4$. As has been already clearly set forth, the rotating body of material consists of two layers, namely an outer layer of metal melt and an inner layer of slag.

In FIG. 2, the transition of forward part 1 to the metal part 2 of the pipe-like body is shown. The metal part 2 has an outer cooling jacket 18 whereas the inner surface for metallurgical use consists of a refractory material. The cooling jacket is provided with arrangements such as rings R, which serve for journalling the pipe-like body.

Figure 3:
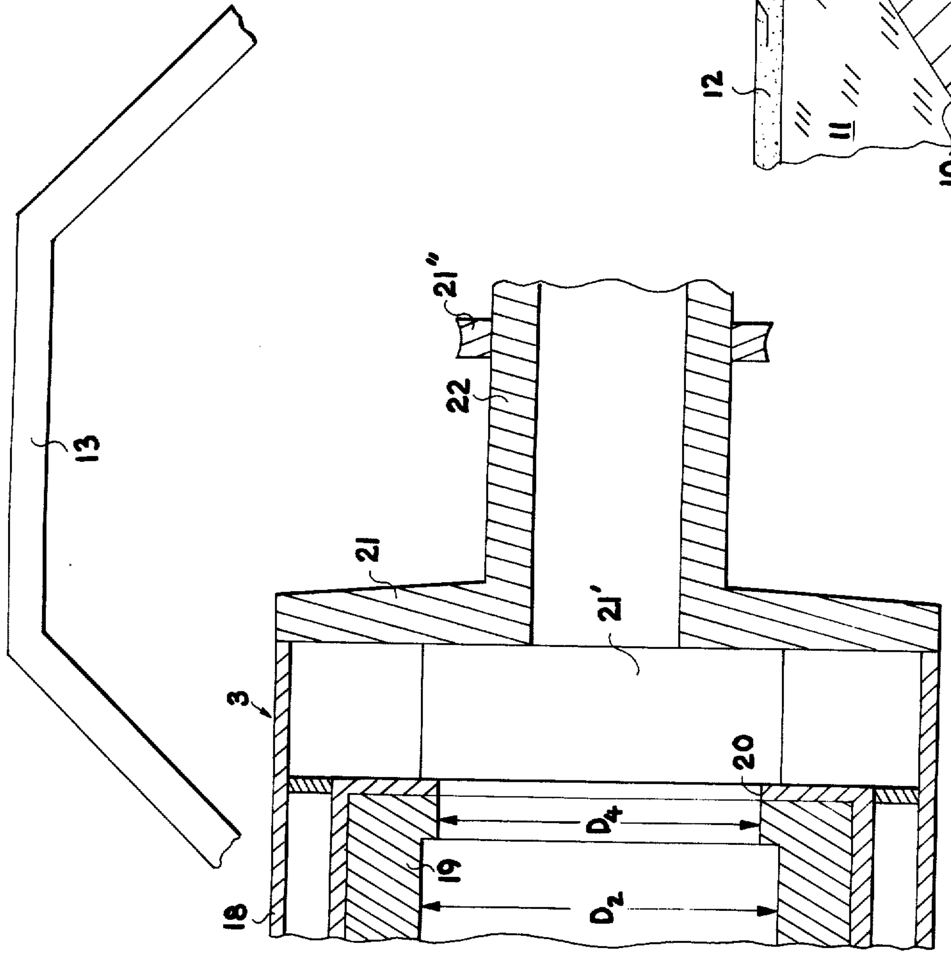
FIG. 3 is a section through the back end of the rotating body.

In FIG. 3, the upper end of the intermediate part 2 and the end piece of the pipe-like body are shown. The upper end 3 merges directly into the metal part 2. In FIG. 3 there is also shown the screen 13, which is already shown in FIG. 1. The inner surface of the pipe-like body is limited upwardly by the edge 20, which has a smaller diameter $D_4$ than the adjacent area. The diameter $D_4$ is normally smaller than the diameter $D_3$ of the mouth. The end part 3 is built as a box, which is formed by an elongation of the cooling jacket 18 and an end plate 21. In the box are several openings 21' for the outflow of the specifically relatively light fluid, such as for example slag, which flows out over the edge 20. On the end plate an axle 22 is fastened which in the case shown constitutes a hollow axle, which has the advantage that through the axle the fluid can be optically observed and any needed control measures applied. The axle is part of a drive arrangement, for example a pulley 21''.

Figure 5:
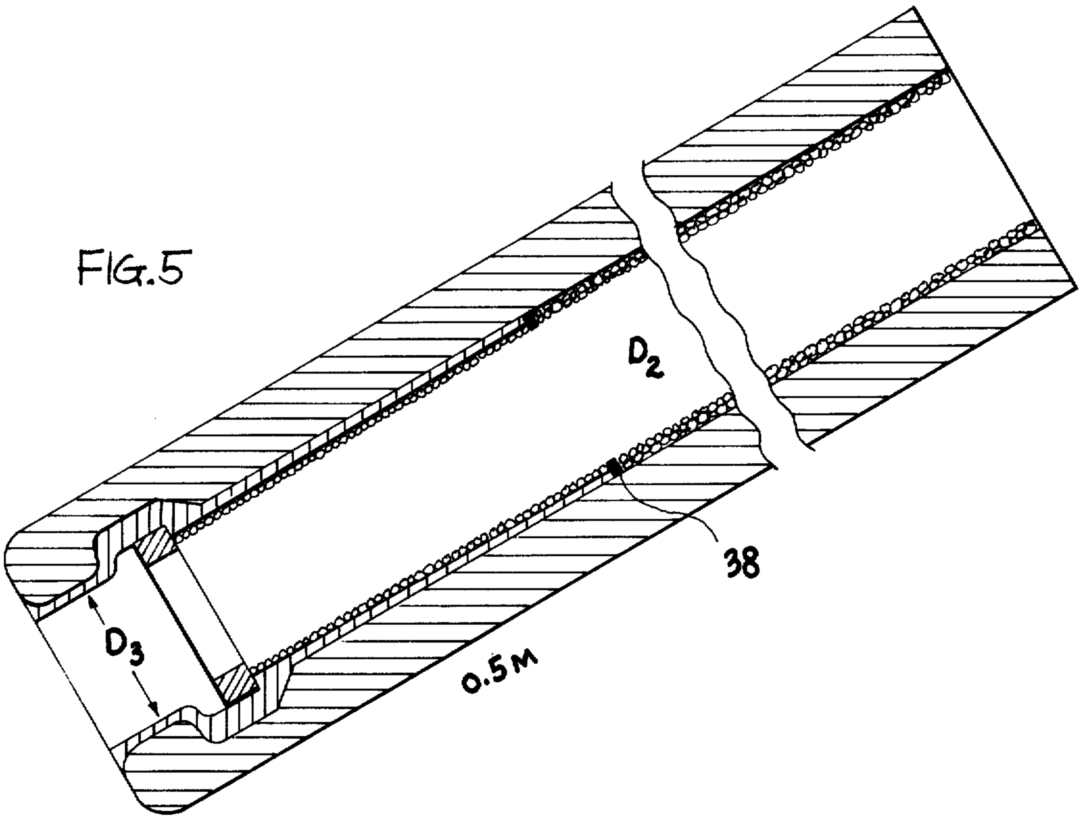
FIG. 5 shows the device in operation.

Referring now to FIG. 5, this shows somewhat diagramatically the operation of the device. Assuming a member of the type shown, the rotation will produce a paraboloid of revolution of the heavier body according to the formula $$h = W^2D^2/8g$$

where $h$ is the height of the paraboloid above diameter D;

D is the diameter of the paraboloid at the base;

W is the angular rotational speed in radians per second; and $g$ is the force of gravity.

Assuming that the device is rotated at 1000 rpm (or about 100 radians per second), and $D_3$ to be 250 mm, this gives a value for $h$ of about 7.8 meters. In other words, if there were no obstruction, the molten metal would rise to such a height. Obviously, however, it is desirable to avoid the use of such a long pipe-like body. If, then, $D_2$ is 265 mm, at a distance 0.25 meters upward from $D_3$ the inner diameter of the paraboloid of molten metal will be about 240 mm. Since the diameter $D_4$ of the upper outlet is less than this value, for example 200 mm, and is located at 0.25 meters from the bottom, it will effectively prevent the escape of the molten metal while the slag is allowed to escape. This is represented in FIG. 5 by the ending of the metal layer at 38. In other words, by providing a dam at this point, the remainder of the pipe-like body, which contains only slag, can be eliminated.

While the slope of the device will cause a slight deviation from the theoretical paraboloid of revolution, the difference is so slight that the figures given above approximate the true figures so closely as not to interfere with the operation in the manner described.

In operation, the metal melt as well as the slag are drawn into the device, and they form two layers. The outer layer of metal melt is determined by the inner diameter $D_3$ of the opening of the mouth. The excess of metal melt flows through the holes 16 back into the container. The slag layer however cannot flow out because this is prevented by the trap. If the slag layer extends so far inwardly that the inner diameter of the layer reaches the edge 20, the slag is ejected.

The slope of the cylindrical body, its speed of rotation and the inner diameters $D_3$, $D_1$, $D_4$ of the openings 15, 15*a* and 20 in conjunction with the depth of penetration determine the manner of operation. It is important for a deslagging operation that not only slag but also metal melt flows into the pipe-like body. This is a condition for the transport of the slag in the container into the arrangement. The flow of metal melt causes the slag to be drawn with it. In order not to hamper the inflow, it should be further assured that the metal melt (or other relatively heavy fluid) receives during the outflow a direction which does not prevent the inflow of fluid. Stationary guiding arrangements both for the inflow and for the outflow which possess suitable geometric characteristics are then sometimes desirable.

Figure 6:
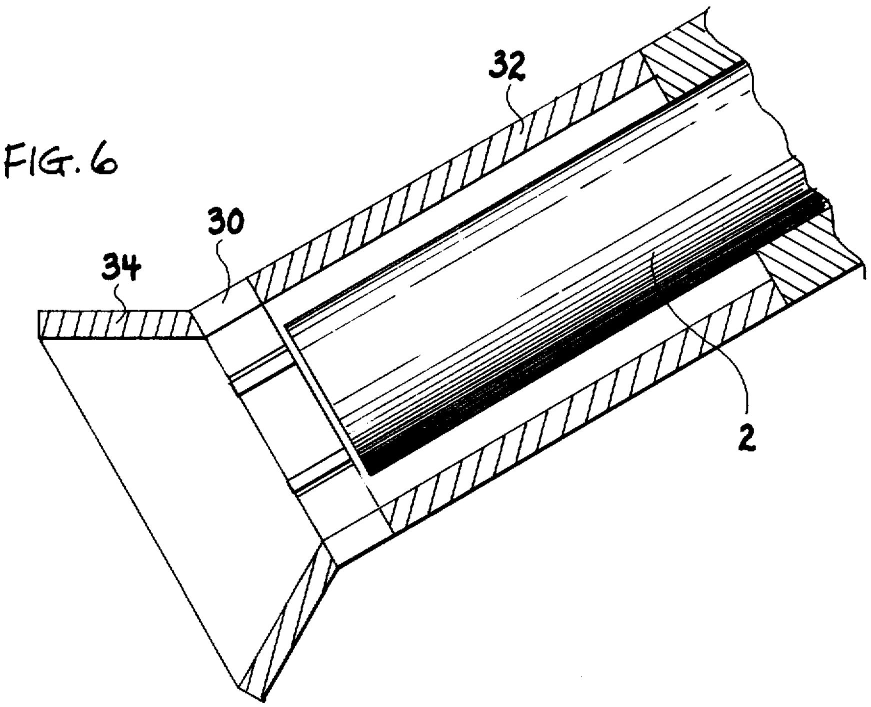
FIG. 6 is an enlargement of a part of the lower end of a form having a deflecting shield.

Such guiding arrangements are shown in FIG. 6, where an extension 32 from the body 2 carries by legs 30 a flaring shield 34. Metal flowing back escapes through openings 30 under centrifugal force and is prevented by the screen from mingling with the slag-metal mixture being drawn in.

The arrangement according to the invention brings, in contrast to the usual deslagging methods through decanting, the special advantage that a very good separation of the metal melt from the slag is produced. Not only will the metal melt and the slag be definitely separated from each other, but also small drops of metal melt will be separated by the strong centrifugal force from the slag and joined with the metal melt. It is advantageous also that a layer of metal melt protects the ceramic walls of the pipe-like body from the direct attack of the slag. In this way the usual harmful attack of aggressive slags is strongly reduced.

Normally the separation forces between the slag and metal melt is very great, so that the separation goes quickly and completely. If however the difference in density is relatively small, or if the separation because of particular surface characteristics or surface phenomena is difficult, for example because of electrical attraction forces, it may be necessary that fluid flowing over the rear edge 20 be subjected to a further separation procedure. This separation procedure can follow in the same way as the first separation or the fluid after passing the edge 20 can be collected and the further separation be carried out for example by gravity. In both cases the heavy fluid, for example a metal melt, can be returned to the container. It is also possible to carry out more than two separations one after the other. The metal melt can be returned to the container in a forced stream, which either alone or together with the guiding arrangements results in a current pattern in the container which is such that on the one hand the inflow stream is imporved and on the other hand the outflow of the inflow stream is not prevented or disturbed.

It is possible to prevent the outflow of liquid at the upper end of the cylindrical body, which can be attained for example by making the inner diameter of the edge smaller or by closing the pipe-like body at the top, and the arrangement then acts no longer in the manner described as a pump but as an apparatus for producing currents in the bath, for example in a melt. In this form the arrangement is a very effective mixing apparatus which can be built in correspondence to the foregoing requirements. Thus it can also be advantageous, for instance, if the arrangement is associated with a pan or a container open from above, to arrange the axis of rotation perpendicular. The arrangement when works only as a turbine with a central intake end and with outlet channels which can be horizontal or vertical. Outlet channels can also be directed upwardly. Such an arrangement which operates in the boundary layer between the metal melt and slag can produce an extraordinary mixing.

The outer surface of the pipe-like body takes the fluid with it so that rotation of the fluid can result, which influences a considerable part of the bath. Thus an effective mixing results, which even exists at a substantial distance from the body. Under suitable conditions the slag can be emulsified in the metal melt by the rotation. If through a corresponding slanted position of the pipe-like body a greater part of the wall surface is brought into contact with the slag and the outlet openings are closed, the device operates as a mixing apparatus.

Figure 4:
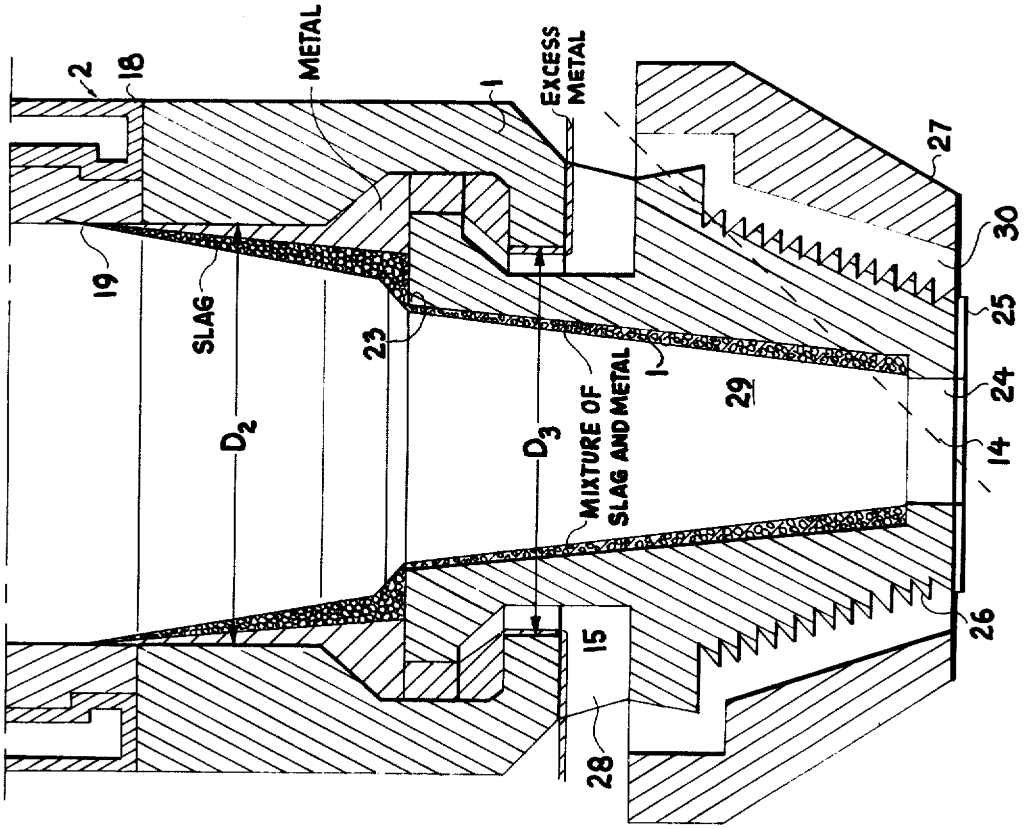
FIG. 4 is a diametral section through the forward end of the pipe-like body in a further embodiment of the invention.

If the arrangement is to produce mainly a flow through in its interior, the rotation which is imparted to the outer surface of the fluid is in general not desired. This can lead to unregulated and disadvantageous turbulence. In order to avoid this, a stationary non-rotatable part is arranged at the rotating body, which can if desired completely cover the body. In order to prevent the melt from causing disturbances by penetrating into the space between the stationary part and the rotating body, seals or flow guide arrangements can be used. An example shown in FIG. 4 is a stationary part 27. The volume fluid which penetrates into the space 30 is pressed from it downwardly around the conical part of the outer surface of the rotating body, so that the tendency to rise up higher in the space 30 is counteracted. On the surface of the rotating body are spirally extending channels 25 or ribs which counteract any centrifugal influence on the fluid by the surface.

In FIG. 4 an example is shown in which the characteristics, which are described above, are essentially as follows:

The arrangement avoids the otherwise resulting danger that the fluid blockage results in a siphon action. The lower part directly opposite the mouth has herein essentially only a pumping function. The conical form of the interior increases this operation, which through ribs (not shown here) or the like can be further increased. The outlet openings 28 are arranged at a distance from the intake end of the pipe-like body and suitably dimensioned in order to reduce the danger of siphoning.

Basically the device according to the invention is a pump which sucks in through one opening and through another opening 28 allows a part of the fluid sucked in to run back. This primary operation can be used in order to force a part of the fluid, for example the surface area, in a predetermined stream. In deslagging this is used in order to allow the slag floating on the melt to flow to the inlet opening. The pipe-like body undergoes in a consequence of its rotation a motion of revolution. In general also guiding arrangements are required. These arrangements must be adapted to different conditions. It is advantageous to mount the guiding arrangements on the apparatus which are arranged for quieting the current outside the pipe-like body.

If the arrangement for example is introduced into a round oven, as is shown in FIG. 1, the guiding arrangements can be vertical discs at the inlet, which together with part 27 form a funnel. Other vertical discs can be arranged at the back end of the fixed part 27. These vertical discs form together with the vertical walls of the oven a narrow channel-like space, to which the fluid flow out of the openings 28 flows. The fluid forms then along the oven wall a current which separates the slag residue which remains behind. The foregoing is an example of the possibility of the provision of guides for the cooperation of the inlet stream and the outlet stream.

If the arrangement is to be used as a pump, the forward end is immersed so deeply in the fluid that both the metal melt and slag can flow through the mouth 15. The pipe is then driven with such high speed that the centrifugal force is at least four times the force of gravity or higher. In many cases substantially higher speeds of rotation can be considered, for example in which the centrifugal acceleration is equal to 100 times the force of gravity or higher. The fluid which is collected in the pipe-like body is set in rotation through the rotation of the pipe-like body so that it quickly forms a layer inside the mouth which covers the whole interior surface of the pipe-like body. Often it is advantageous to provide the inner part of the pipe-like body where the fluid is driven in or even over a longer area (in FIG. 4 for example up to the trap) with arrangements for carrying along the fluid such as ribs, which have a pumping effect and set the fluid in faster rotation. Such arrangements are not shown in the drawings.

If the rotational speed is increased, the freedom of choice of the dimensions of the various diameters is greater. In every particular case, however, the known hydrodynamic laws are the basis of the choice.

The apparatus as shown has value not only because of the processing within the apparatus but also because it operates as a pump picking up melt from the container, where it separates and returns the slag to the same container. Because the efficiency of the device may be reduced if the escaping melt mixes partly with the inflow, and because its flow is rather vigorous, it is desirable to guide it to prevent such disturbances. Likewise this helps to ensure that the bulk of fluid in the container flows into a pattern which brings the surface layer completely to the entrance opening.

I claim:

1. A method of separating a mixture of metal melt and slag which comprises introducing the mixture into the lower end of a hollow cylinder body mounted to rotate about a slanting axis, rotating the body about such axis at a sufficient speed to draw the mixture upwardly in the body to form the slag into a truncated paraboloid of revolution with its lower end surrounded by the melt to separate the melt from the slag, preventing upward movement of the melt in the cylinder body beyond a predetermined point by limiting the upward movement thereof and simultaneously permitting discharge of the melt downwardly, and preventing downward movement of the slag which has been separated from the melt, while permitting the escape of the slag at the upper end of said body.

2. A device for separating a mixture of metal melt and slag which comprises a pipe-like body having an internal wall, means mounting said body to rotate about a slanting axis at a sufficient speed to form the slag into a truncated paraboloid of revolution with its lower end surrounded by the melt, said body including means to prevent upward movement of the melt beyond a predetermined point by limiting the upward movement thereof, means for simultaneously permitting discharge of the separated melt downwardly into the mixture, means for preventing downward movement of the slag which has been separated from the melt and means for permitting the escape of the slag at the top.

3. A device as claimed in claim 2, in which said means for permitting the escape of the slag comprises a first opening at the upper end of the body, said body having a second opening at its lower end constituting the means for permitting the discharge of the separated melt downwardly, and said means for preventing downward movement of the slag comprises trap means adjacent said second opening for preventing the slag from escaping through the second opening, said trap means comprising a ring spaced inwardly from the wall of the body and having a substantially unobstructed opening therethrough, and said means for limiting the upward movement comprises an annular limiting edge forming an opening with a diameter less than the diameter of the internal wall of the body.

4. In a device as claimed in claim 3, the diameter of the internal wall of the body being greater than the diameter of said second opening.

5. A device for separating a mixture of metal melt and slag which comprises a pipe-like body having an internal wall, means mounting said body to rotate about a slanting axis at a sufficient speed to form the slag into a truncated paraboloid of revolution with its lower end surrounded by the melt, said body having an inlet opening at its lower end, a section above the inlet opening having a greater diameter than that of the inlet opening, an annular member in said section of less diameter than the diameter of the section and having a substantially unobstructed opening therethrough, the diameter of the internal wall of the body above said section being less than the diameter of the section, an annular limiting edge at the upper end of the body forming an opening at the upper end of the body of less diameter than the internal diameter of the body and at least one opening in the wall of the body above the limiting edge to permit the discharge of the separated slag.

6. In a device as claimed in claim 5, wherein said section is constructed and arranged to allow melt to flow back downwardly outside of the annular member, and means to guide such melt away from the inlet opening.

* * * * *